United States Patent [19]

Berner et al.

[11] Patent Number: 5,091,439
[45] Date of Patent: Feb. 25, 1992

[54] PROCESS FOR CURING POLYURETHANE COATINGS AND COMPOSITIONS

[75] Inventors: Godwin Berner, Binningen; Manfred Rembold, Aesch; Franciszek Sitek, Therwil; Werner Rutsch, Fribourg, all of Switzerland

[73] Assignee: Ciba-Geigy Corporation, Ardsley, N.Y.

[21] Appl. No.: 249,608

[22] Filed: Nov. 18, 1988

Related U.S. Application Data

[63] Continuation-in-part of Ser. No. 63,191, Jun. 16, 1987, abandoned.

[30] Foreign Application Priority Data

Jun. 17, 1986 [CH] Switzerland ............... 2436/86

[51] Int. Cl.$^5$ ............... C08G 18/22; C08G 18/82
[52] U.S. Cl. ............... 522/26; 522/27; 522/28; 522/29; 522/55; 522/59; 522/64; 522/174; 528/51; 528/56; 528/85
[58] Field of Search ............... 522/26–29, 522/55, 59, 64; 528/51, 56, 85

[56] References Cited

U.S. PATENT DOCUMENTS

| | | | |
|---|---|---|---|
| 4,076,657 | 1/1978 | Kracklauer | 260/2.5 AJ |
| 4,143,002 | 3/1979 | Gill | 521/137 |
| 4,220,731 | 9/1980 | Zuppinger | 521/156 |
| 4,377,646 | 3/1983 | Blout | 521/154 |
| 4,549,945 | 10/1985 | Lindstrom | 204/159.11 |
| 4,613,660 | 9/1986 | Goel | 528/73 |

FOREIGN PATENT DOCUMENTS

| | | |
|---|---|---|
| 94915 | 11/1983 | European Pat. Off. |
| 109851 | 5/1984 | European Pat. Off. |
| 977979 | 8/1974 | Fed. Rep. of Germany |

OTHER PUBLICATIONS

McManus, JCS Chem. Comm., 253 (1974).
Korshak, CA 76, 114905y (1972).
McManus, CA 79, 116025x (1973).

*Primary Examiner*—Marion E. McCamish
*Assistant Examiner*—Arthur H. Koeckert
*Attorney, Agent, or Firm*—Harry Falber

[57] ABSTRACT

Compounds of the formula $$[(R^1)Fe^{II}(R^2)]_a^+ \ [X]^{a-} \qquad (I)$$

in which a is 1, 2, or 3, $R^1$ is an uncharged, carbocyclic or heterocyclic aromatic ring, unsubstituted or substituted, $R^2$ is an unsubstituted or substituted cyclopentadienyl or indenyl anion, and $|X|^{a-}$ is an a-valent anion, are suitable for use as latent curing catalysts for two-component polyurethane coatings which are activated by irradiation with actinic light or by heating.

24 Claims, No Drawings

PROCESS FOR CURING POLYURETHANE COATINGS AND COMPOSITIONS

CROSS REFERENCE

This is a continuation-in-part of Ser. No. 063,191 filed June 16, 1987, now abandoned.

DETAILED DESCRIPTION

The invention relates to a process for curing two-component polyurethane coatings by adding a latent catalyst belonging to the class comprising certain arene-iron(II) compounds, and to compositions useful in that process.

The polyurethane coatings which are customary in the paint industry are mainly two-component coatings which are cured by reacting a polyhydroxy compound with a polyisocyanate. Examples of polyhydroxy compounds used are polyether-polyols, polyester-polyols or hydroxyalkyl esters of polyacrylates. The polyisocyanates used are preferably diisocyanates and triisocyanates. The two components are used in an approximately equimolar ratio of OH groups to NCO groups. The reaction takes place relatively slowly at room temperature, and in the application of coatings in industry the reaction is therefore accelerated in most cases by raising the temperature, by adding catalysts, or by both of these measures. The catalysts used are principally tertiary amines or organometallic compounds, for example dibutyltin dilaurate.

The reaction between the two components, and hence the curing of the coating, begins as soon as the two components and the catalyst are mixed. Only a short pot life is then available for the application process.

It has now been found that this problem can be solved by using a masked or latent catalyst which, after application, can be activated either by heat or by actinic light. The activation of the catalyst by actinic light is preferably effected by means of light of wavelengths in the range of from 200 to 600 nm. Certain types of arene-cyclopentadienyl-iron(II) salts can be used as latent catalysts capable of activation in this manner.

The invention therefore relates to a process for curing polyurethane coatings consisting of at least one polyhydroxy compound and at least one polyisocyanate or a masked polyisocyanate, and comprises adding, as a latent curing catalyst, a compound of the Formula

$$[(R^1)Fe^{II}(R^2)]_a^+ \; [X]^{a-} \quad (I)$$

in which a is 1, 2, or 3, $R^1$ is an uncharged carbocyclic or heterocyclic aromatic ring, unsubstituted or substituted, $R^2$ is an unsubstituted or substituted cyclopentadienyl or indenyl anion, and $[X]^{a-}$ is an a-valent anion, to the coating before application, and heating the coating or irradiating it with actinic light after application. It is preferable first to irradiate the coating and then to heat it to 50°–150° C.

$R^1$ is an uncharged η-arene and can be a heterocyclic or carbocyclic arene, preferably a carbocyclic arene. Examples of heterocyclic arenes and substituted products thereof are 5-membered or 6-membered heteroaromatic structures containing O, N and/or S atoms, and fused derivatives and alkyl derivatives thereof, for example thiophene, chromene, xanthene, thioxanthene, benzothiophene, naphthothiophene, thianthrene, diphenylene oxide, diphenylene sulfide, methylxanthene, isopropylthioxanthene, 3-methylbenzothiophene, pyridine, quinoline, quinaldine, isoquinoline, carbazole, N-methylcarbazole, acridine, phenazine, and N-ethylphenthiazine. Examples of unsubstituted carbocyclic arenes are, in particular, benzene, naphthalene, indene, fluorene, pyrene, phenanthrene, anthracene, 9,10-dihydroanthracene, tetrahydronaphthalene, naphthacene, coronene, biphenylene, and triphenylene. Examples of substituted carbocyclic arenes are, in particular, benzene, naphthalene or anthracene substituted by $C_1$–$C_{14}$-alkyl, halogen, phenyl, $C_1$–$C_{10}$-alkoxy, cyano, $C_7$–$C_{12}$-alkylphenyl, $C_7$–$C_{11}$-phenylalkyl, $C_8$–$C_{18}$-alkylphenylalkyl, $C_2$–$C_{13}$-alkoxycarbonyl, phenoxy, phenylthio, phenoxycarbonyl, styryl, $C_1$–$C_4$-alkylstyryl, and $C_1$–$C_4$-alkoxystyryl. Examples of these are toluene, xylene, ethylbenzene, cumene, tert.butylbenzene, methylnaphthalene, methoxybenzene, ethoxybenzene, dimethoxybenzene, chlorobenzene, bromobenzene, dichlorobenzene, chloronaphthalene, bromonaphthalene, benzonitrile, methyl benzoate, dodecyl benzoate, diphenyl ether, diphenyl sulfide, stilbene, 4,4'-dimethylstilbene, 4,4'-dimethoxystilbene, 9-benzylanthracene, and 9-(4-butylbenzyl)-anthracene.

$R^1$ is preferably benzene, toluene, xylene, cumene, methoxybenzene, chlorobenzene, 4-chlorotoluene, naphthalene, methylnaphthalene, chloronaphthalene, methoxynaphthalene, biphenyl, indene, pyrene, biphenylene sulfide, diphenyl ether, stilbene, or 9-(4-butylbenzyl)-anthracene.

$R^2$ is a cyclopentadienyl or indenyl anion which optionally can be substituted with $C_1$–$C_8$-alkyl, $C_2$–$C_5$-alkanoyl, $C_2$–$C_6$-alkoxycarbonyl, cyano or phenyl. Examples of these are the anions of methyl-, ethyl-, n-propyl-, iso-propyl-, n-butyl-, tert.butyl-, n-hexyl- or n-octyl-cyclopentadiene, methyl-, ethyl- or isopropylindene, dimethylcyclopentadiene, acetyl-, propionyl- or butyryl-cyclopentadiene, methyl or ethyl cyclopentadienecarboxylate and cyanoindene. $R^2$ is preferably a cyclopentadienyl or ($C_1$–$C_4$-alkyl)-cyclopentadienyl anion.

The anion $[X]^{a-}$ can be an inorganic or organic anion; it is preferably the anion of a sulfonic acid. Examples are the anions $F^-$, $Cl^-$, $Br^-$, $I^-$, $CN^-$, $NCO^-$, $NCS^-$, $CH_3-COO^-$, $CF_3COO^-$, $SO_4^{2-}$, $PO_4^{3-}$, $NO_3^-$, $ClO_4^-$, $[(phenyl)_4B]^-$, $C_6H_5SO_3^-$, $CH_3C_6H_4SO_3^-$, $CF_3C_6H_4SO_3^-$, $CH_3SO_3^-$, $CF_3SO_3^-$, $C_4F_9SO_3^-$, $C_8F_{17}SO_3^-$, $C_6F_5SO_3^-$, $BF_4^-$, $AlF_4^-$, $AlCl_4^-$, $TiF_6^{2-}$, $PF_6^-$, $SbF_6^-$, $SbCl_6^-$, $GeF_6^-$, $ZrF_6^{2-}$, $FeCl_4^-$, $SnF_6^-$, $SnCl_6^-$ or $BiCl_6^-$.

The anion $[X]^{a-}$ is preferably a monovalent anion, especially one from the series comprising $BF_4^-$, $FP_6^-$, $SbF_6^-$, $AsF_6^-$, $CF_3COO^-$, $CH_3SO_3^-$, $CF_3SO_3^-$ or $C_8F_{17}SO_3^-$.

The following are examples of compounds which can be used in accordance with the invention as latent curing catalysts:

(η<sup>6</sup>-benzene)(η<sup>5</sup>-cyclopentadienyl)-iron(II) hexafluorophosphate (η<sup>6</sup>-toluene)(η<sup>5</sup>-indenyl)-iron(II) hexafluorophosphate (η<sup>6</sup>-toluene)(η<sup>5</sup>-cyclopentadienyl)-iron(II) tetrafluoroborate (η<sup>6</sup>-toluene)(η<sup>5</sup>-cyclopentadienyl)-iron(II) hexafluoroantimonate (η<sup>6</sup>-ethylbenzene)(η<sup>5</sup>-cyclopentadienyl)-iron(II) hexafluoroantimonate

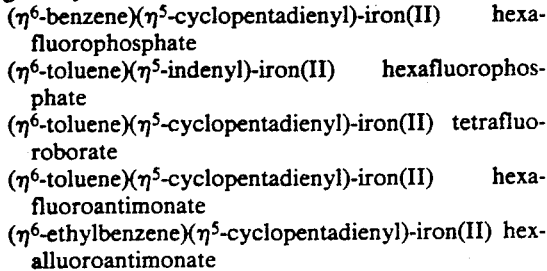

(η6-cumene)(η5-cyclopentadienyl)-iron(II) hexafluorophosphate
(η6-cumene)(η5-cyclopentadienyl)-iron(II) hexafluoroantimonate
(η6-cumene)(η5-methylcyclopentadienyl)-iron(II) hexafluoroarsenate
(η6-cumene)(η5-methylcyclopentadienyl)-iron(II) tetrafluoroborate
(η6-cumene)(η5-indenyl)-iron(II) tetrafluoroborate
(η6-xylene)(η5-cyclopentadienyl)-iron(II) perchlorate
(η6-mesitylene)(η5-cyclopentadienyl)-iron(II) hexafluorophosphate
(η6-methoxybenzene)(η5-cyclopentadienyl)-iron(II) hexafluoroantimonate
(η6-chlorotoluene)(η5-cyclopentadienyl)-iron(II) hexafluorophosphate
(η6-naphthalene)(η5-cyclopentadienyl)-iron(II) hexafluorophosphate
(η6-naphthalene)(η5-cyclopentadienyl)-iron(II) hexafluoroantimonate
(η6-methylnaphthalene)(η5-cyclopentadienyl)-iron(II) hexafluorophosphate
(η6-2-methylnaphthalene)(η5-cyclopentadienyl)-iron(II) hexafluoroantimonate
($f^6$-1-chloronaphthalene)(η5-cyclopentadienyl)-iron(II) hexafluorophosphate
($f^6$-2-methoxynaphthalene)(η5-cyclopentadienyl)-iron(II) hexafluoroantimonate
(η6-diphenyl)(η5-cyclopentadienyl)-iron(II) hexafluoroarsenate
(η6-biphenyl sulfide)(η5cyclopentadienyl)-iron(II) hexafluorophosphate
(η6-pyrene)(η5-cyclopentadienyl)-iron(II) hexafluorophosphate
η6-anthracene)(η5-cyclopentadienyl)-iron(II) hexafluorophosphate
(η6-perylene)(η5-methylcyclopentadienyl)-iron(II) hexafluorophosphate
(η6-indene)(η5-indenyl)-iron(II) hexafluorophosphate
(η6-9,10-hydroanthracene)(η5-cyclopentadienyl)-iron(II) hexafluoroantimonate
(η6-stilbene)(η5-cyclopentadienyl)-iron(II) hexafluorophosphate
(η6-9-[4-butylbenzyl]anthracene)(η5-cyclopentadienyl)-iron(II) hexafluorophosphate
(η6-cumene)(η5-cyclopentadienyl)-iron(II) acetate
(η6-cumene)(η5-cyclopentadienyl)-iron(II) trifluoroacetate
(η6-cumene)(η5-cyclopentadienyl)-iron(II) toluenesulfonate
(η6-cumene)(η5-cyclopentadienyl)-iron(II) trifluoromethanesulfonate
(η6-cumene)(η5-cyclopentadienyl)-iron(II) perfluorooctanesulfonate
(η6-2-methylnaphthalene)(η5-cyclopentadienyl)-iron(II) hexafluorophosphate
(η6-2-methylnaphthalene)(η5-cyclopentadienyl)-iron(II) trifluoromethanesulfonate; and
(η6-2-methylnaphthalene)(η5-cyclopentadienyl)-iron(II) perfluorooctanesulfonate Many of the compounds of the Formula I are known compounds, a number of such compounds and their preparation being described in, for example, EP-A 94,915. The compounds of Formula I in general can be prepared from the corresponding chloride salt of Formula I by reaction with at least an equivalent amount of an acid of the formula $$(H)_d(X)^{a-} \quad (IIA)$$

or with an alkali metal or ammonium salt thereof $$(M)_d(X)^{a-} \quad (IIB)$$

where M is a metal or ammonium cation.

The chloride salt of Formula I in turn can be obtained by reaction of a metallocene of the formula $$(R^2)_2Fe \quad (III)$$

with the appropriate arene of the Formula $R^1$ in the presence of aluminum chloride and aluminum metal, as described in EP-A 94,915.

The use of the compounds of Formula I in initiating cationic polymerization of epoxide resins is described in EP-A 94,915 and EP-A 109,851. Cationic polymerization, however, proceeds by a different reaction mechanism from the reaction of isocyanates with hydroxy compounds. It also is known that typical polyurethane catalysts, for example tertiary amines or organotin salts, cannot be used for curing cationically polymerizable compounds, and conversely typical cationic polymerization catalysts, for example $BF_3$, $AlCl_3$ or strong proton acids, cannot be used as polyurethane catalysts.

As described in EP-A 152,377, the activity of the catalysts described can be increased by adding certain sensitizers. These are compounds having a triplet energy of at least 30 kcal/mol. Examples thereof are compounds belonging to the class comprising thioxanthones, phthalimides, coumarins and polycyclic aromatic compounds. Thioxanthone, anthracene and derivatives thereof are preferentially suitable.

The polyurethane coatings which can be cured catalytically in accordance with the invention are two-component systems composed of polyhydroxy and polyisocyanate components. Apart from the generally customary polyester-polyols and polyether-polyols, polyacrylates containing hydroxyl groups are also frequently used as the polyhydroxy compound. These polyacrylates are in most cases copolymers of hydroxyalkyl acrylates with alkyl acrylates or other ethylenically unsaturated comonomers. A further class of polyols used particularly for PUR coatings is constituted by epoxide resins containing hydroxyl groups and modification products thereof, for example addition products thereof with glycols or hydroxyalkylamines.

The polyisocyanates used for polyurethane coatings are, on the one hand, the customary low-molecular diisocyanates and triisocyantes with less that stoichiometric amounts of diols and triols are also used. These products constitute oligomeric polyurethanes containing terminal isocyanate groups. It is also possible to employ masked isocyanates instead of the free isocyanates. If the hydroxy and isocyanate components are selected appropriately, it is possible to modify the properties of the polyurethane coatings in an appropriate manner. The technical details relating to this are known to the coating expert and are to be found in reference books, for example in H. Kittel, Lehrbuch der Lacke und Beschichtungen, ("Textbook of Finishes and Coatings"), Volume I, part 2, pages 512–612 (Verlag Colomb, Berlin, 1973).

The coatings can be applied with or without a solvent. For the industrial application of coatings they are often used with a small amount of solvent as so-called "high solids" coatings. Application can be carried out by customary methods, for example by brushing, spraying, dipping, rolling, electrostatic spraying, or electrophoretic deposition, in particular cataphoretic deposition. An example of solvent-free application is afforded by the polyurethane powder coatings which are in most cases applied electrostatically to the substrate.

Any solid material, for example metals, ceramic compositions, plastics, wood, paper or textiles, is a suitable substrate. The application of coatings to metal objects, for example vehicles, machinery, equipment and constituents thereof, is of particular importance in the application of coatings in industry. Application can be effected by the one-coat or two-coat process.

Depending on the mode of application and the end use, further additives can be mixed into the coatings. These are, in particular, pigments, dyestuffs and fillers, but also auxiliaries, such as flow control agents, thixotropic agents, fire-retarding agents, antistatic agents, light stabilizers, antioxidants or metal deactivators. The addition of a light stabilizer belonging to the series comprising sterically hindered amines is particularly important.

The compounds of the Formula I can be dissolved beforehand in the hydroxy component of the polyurethane composition. They can, however, also be dissolved beforehand in an inert organic solvent, for example in esters, ethers, ketones, or aromatic hydrocarbons, and these solutions can be mixed into the hydroxy component.

The invention therefore also relates to polyhydroxy compounds which are suitable for the preparation of polyurethane coatings and which contain, as a latent curing catalyst for the polyurethane coating, a compound of the Formula I and, if appropriate, one or more organic solvents.

The amount of catalyst used depends on the rate of curing desired; in general amounts within the range from 0.01 to 10% by weight, preferably 0.05 to 2% by weight, relative to the hydroxy component, are required.

The catalyst can also be added after the hydroxy and isocyanate components have been mixed. In this case too it is advisable to dissolve the catalyst beforehand in an inert solvent.

The mixture of all three components and possible other additives thus obtained has a pot life of several hours at room temperature in the dark or in red light, whereas the pot lives when conventional curing catalysts are used are less than one hour.

The invention therefore also relates to polyurethane coatings containing at least one polyhydroxy compound, at least one polyisocyanate and a compound of the Formula I as a latent curing catalyst. These coatings preferably contain 0.01 to 5% by weight, in particular 0.05 to 0.5% by weight, of catalyst, relative to the solids content of the coating.

The coating can be irradiated immediately before application or after application. If a solvent has been used, this can be removed before or after irradiation. The irradiation equipment customary in UV technology, in particular, is used for the irradiation. In this equipment, the workpiece is in most cases passed through under one or more light sources. The coating, however, also can be irradiated in the supply line to the application device. Examples of suitable light sources are xenon lamps, argon lamps, tungsten lamps, carbon arc lamps, metal halide lamps or metal arc lamps, for example low-pressure, medium-pressure or high-pressure mercury vapor lamps. The light from these lamps is rich in actinic light having a wavelength of 200-600 nm. The irradiation times are between one second and one minute, preferably 5-20 seconds. Laser radiation, for example argon ion laser radiation, is also suitable for curing the coatings.

The irradiation converts the latent curing catalyst into an activated form. The activated form accelerates the reaction between OH and NCO groups. The chemical processes which take place in this reaction are not known accurately yet. Further curing of the coating can be effected by subsequently heating the coated article at 50°-150° C. after irradiation. The processes and equipment customary in the coating technology, such as infrared irradiation, inductive heating and particularly heating with hot air and stove heating, can be used for this purpose. The advantage of the coatings catalyzed in accordance with the invention in heat-curing is that lower curing temperatures are required as a result of the presence of the catalyst. This is not merely a saving in energy, but also permits the rapid curing of temperature-sensitive articles. Stoving temperatures of about 60° C. are sufficient at curing times of 20 to 30 minutes.

The coating also can be cured by heat without irradiation, since the catalyst also can be activated by heat. However, it is preferable to carry out the process with irradiation, since lower curing temperatures are required in this case.

In the following examples, percentages and parts are each by weight, unless otherwise stated.

EXAMPLE 1

A high-solids polyurethane coating is prepared from 55 parts of a 70% xylene solution of a polyacrylate resin containing hydroxyl groups (Desmophen ® LS 2747, Bayer AG), 26 parts of a 90% ethylglycol acetate solution of an aliphatic polyisocyanate (Desmodur ® N 3390, Bayer AG), and 19 parts of ethylglycol acetate. The coating has a solids content of 61%. Individual portions of the coating are mixed with the amounts of curing catalysts indicated in Table 1 and are applied by means of a doctor blade to aluminum sheets (0.5 mm) in a thickness of approximately 70 m, which corresponds to a dry film thickness of approximately 40 m. The samples are passed through an irradiation apparatus twice at a band speed of 5 m/minute, using a Type D fusion lamp (120 watts/cm). The samples are then heated at 70° C. in a circulating air oven for 20 minutes. The pendulum hardness of the coating films is measured by Koenig's method after a storage time of 1 hour.

As a comparison, a sample without catalyst is subjected to the same heat treatment, without irradiation.

In order to determine the stability on storage (pot life), the viscosity of the coatings is measured by means of a cone and plate viscometer before and after storage in the dark for three hours at room temperature. The relative increase in viscosity is shown in Table 1.

TABLE 1

| Catalysts[1] | Relative increase in viscosity during 3 hours | Exposure to irradiation | Pendulum hardness |
|---|---|---|---|
| None | 5-10% | — | 11 |
| 0.05% of catalyst 1[2] | 5-10% | + | 43 |

TABLE 1-continued

| Catalysts[1] | Relative increase in viscosity during 3 hours | Exposure to irradiation | Pendulum hardness |
|---|---|---|---|
| 0.1% of catalyst 1[2] | 5-10% | + | 40 |

[1]Amount relative to the solids content of the coating
[2]Catalyst 1 = ($\eta^6$-cumene)($\eta^5$-cyclopentadienyl)-iron(II) hexafluorophosphate

EXAMPLE 2

A mixture of the following is prepared:
46.7 g of a 65% solution in ethylglycol acetate of a branched polyester containing hydroxyl groups (Desmophen ® 650, Bayer AG) and 53.3 g of a 75% solution in ethylglycol acetate of a masked aliphatic polyisocyanate (Desmodur ® KL 5-2540, Bayer AG).

This mixture is diluted with 10 g of a mixture composed of equal parts of xylene, butyl acetate and ethylglycol acetate in which the catalyst previously has been dissolved. The following are used as the catalyst:

Catalyst 1 = ($\eta^6$-cumene)($\eta^5$-cyclopentadienyl)-iron(II) hexafluorophosphate Catalyst 2 = ($\eta^6$-cumene)($\eta^5$-cyclopentadienyl)-iron(II) trifluoromethanesulfonate The coating is applied in a thickness of 150 m to a thick aluminum sheet and several samples are irradiated in a PPG irradiation apparatus for the indicated duration using 2 lamps of 80 watts. All samples are then cured in a circulating air oven for 30 minutes at 110° or 130° C. The pendulum hardness of the samples is measured by Koenig's method 30 minutes after curing.

The results are shown in Tables 2 and 3.

TABLE 2 curing at 110° C./30 minutes

| Catalyst | Exposure time (seconds) | Pendulum hardness (seconds) |
|---|---|---|
| 1% of catalyst 1 | None | 78 |
| | 2.1 seconds | 95 |
| | 8.4 seconds | 97 |
| | 12.6 seconds | 104 |
| 1% of catalyst 2 | None | 83 |
| | 2.1 seconds | 95 |
| | 8.4 seconds | 94 |
| | 12.6 seconds | 99 |
| 4% of catalyst 2 | None | 77 |
| | 2.1 seconds | 99 |
| | 8.4 seconds | 126 |
| | 12.6 seconds | 137 |
| no catalyst | — | 70 |

TABLE 3 curing at 130° C./30 minutes

| Catalyst | Exposure time (seconds) | Pendulum hardness (seconds) |
|---|---|---|
| 1% of catalyst 1 | None | 206 |
| | 2.1 seconds | 211 |
| | 8.4 seconds | 211 |
| | 12.6 seconds | 213 |
| 1% of catalyst 2 | None | 203 |
| | 2.1 seconds | 210 |
| | 8.4 seconds | 216 |
| | 12.6 seconds | 218 |
| 4% of catalyst 2 | None | 196 |
| | 2.1 seconds | 207 |
| | 8.4 seconds | 213 |
| | 12.6 seconds | 211 |
| no catalyst | — | 91 |

EXAMPLE 3

A mixture is prepared in accordance with Example 2, utilizing however, 53.3 g of a 75% solution of Desmodur ® BL 3175 polyisocyanate (Bayer AG) in place of KL 5-2470. This is diluted with 10 g of 1:1:1 xylene, butyl acetate, and ethylene glycol acetate as therein described in which 1 g of ($\eta^6$-cumene)($\eta^5$-cyclopentadienyl)-iron(II) hexafluorophosphate has been previously dissolved. Coatings are then prepared and irradiated as therein described, following which the activated coatings are heated in a circulating air oven at 130° C. for 30 minutes. The results are as follows:

| Amount of Catalyst | Exposure time (seconds) | Pendulum hardness (seconds) |
|---|---|---|
| 0% | None | 24 |
| 1% | None | 29 |
| 1% | 2.1 seconds | 71 |
| 1% | 8.4 seconds | 88 |
| 1% | 12.6 seconds | 92 |

EXAMPLE 4

The procedure of Example 3 was followed, using, however, 1% of ($\eta^6$-cumene)($\eta^5$-cyclopentadienyl)-iron(II) hexafluoroarsenate. The results of testing are as follows:

| Amount of Catalyst | Exposure time (seconds) | Pendulum hardness (seconds) |
|---|---|---|
| 0% | None | 24 |
| 1% | None | 38 |
| 1% | 2.1 seconds | 81 |
| 1% | 8.4 seconds | 105 |
| 1% | 12.6 seconds | 105 |

EXAMPLE 5

The procedure of Example 3 was followed, using, however, 1% of ($\eta^6$-cumene)($\eta^5$-cyclopentadienyl)-iron(II) hexafluoroantimonate. The results of testing are as follows:

| Amount of Catalyst | Exposure time (seconds) | Pendulum hardness (seconds) |
|---|---|---|
| 0% | None | 24 |
| 1% | None | 36 |
| 1% | 2.1 seconds | 80 |
| 1% | 8.4 seconds | 95 |
| 1% | 12.6 seconds | 97 |

EXAMPLE 6

A mixture of 46.7 g of a 65% solution of a hydryoxyl group containing branched polyester in ethylglycol acetate (Desmosphen ® 650, Bayer AG) and 53.3 g of a 75% solution of a masked aliphatic diisocyanate in ethylglycol acetate (Desmodur ® BL 3175, Bayer AG) was diluted with 10 g of a 1:1:1 mixture of xylene, butyl acetate and ethylglycol acetate in the test, additives in the indicated amount was previously dissolved. The additives tested were Catalyst 1 and ferrocene.

The coating solution was applied to an aluminum sheet in a wet thickness of 150 m (dry 40-50 m). The samples were irradiated in a PPG irradiation apparatus for the indicated time with 2 lamps of 80 watts. The samples then were cured in a circulating air oven for 30 minutes at 110° C. or 130° C.

Thirty minutes after curing, the pendulum hardness of the coatings was measured by the method of Koenig (DIN 53,157). The results are as follows:

| Additive | Amount | Exposure time (seconds) | Temperature | Pendulum hardness (seconds) |
|---|---|---|---|---|
| None | None | None | 110° | 17 |
| Ferrocene | 1% | None | 110° | 17 |
| Ferrocene | 1% | 2.1 | 110° | 17 |
| Ferrocene | 1% | 8.4 | 110° | 17 |
| Ferrocene | 1% | 12.6 | 110° | 17 |
| Ferrocene | 4% | None | 110° | 17 |
| Ferrocene | 4% | 2.1 | 110° | 18 |
| Ferrocene | 4% | 8.4 | 110° | 18 |
| Ferrocene | 4% | 12.6 | 110° | 20 |
| Catalyst 1 | 1% | None | 110° | 28 |
| Catalyst 1 | 1% | 2.1 | 110° | 39 |
| Catalyst 1 | 1% | 8.4 | 110° | 42 |
| Catalyst 1 | 1% | 12.6 | 110° | 43 |
| Catalyst 1 | 4% | None | 110° | 22 |
| Catalyst 1 | 4% | 2.1 | 110° | 28 |
| Catalyst 1 | 4% | 8.4 | 110° | 56 |
| Catalyst 1 | 4% | 12.6 | 110° | 60 |
| None | None | None | 130° | 45 |
| Ferrocene | 1% | None | 130° | 66 |
| Ferrocene | 1% | 2.1 | 130° | 67 |
| Ferrocene | 1% | 8.4 | 130° | Note 1 |
| Ferrocene | 1% | 12.6 | 130° | Note 1 |
| Ferrocene | 4% | None | 130° | 77 |
| Ferrocene | 4% | 2.1 | 130° | 84 |
| Ferrocene | 4% | 8.4 | 130° | Note 1 |
| Ferrocene | 4% | 12.6 | 130° | Note 1 |
| Catalyst 1 | 1% | None | 130° | 105 |
| Catalyst 1 | 1% | 2.1 | 130° | 119 |
| Catalyst 1 | 1% | 8.4 | 130° | 129 |
| Catalyst 1 | 1% | 12.6 | 130° | 130 |
| Catalyst 1 | 4% | None | 130° | 105 |
| Catalyst 1 | 4% | 2.1 | 130° | 171 |
| Catalyst 1 | 4% | 8.4 | 130° | 171 |
| Catalyst 1 | 4% | 12.6 | 130° | 176 |

Note 1: Surface wrinkled; hardness not detectable.

What is claimed is:

1. A process for curing polyurethane coatings containing at least one polyhydroxy compound and at least one polyisocyanate, or a masked polyisocyanate, which comprises adding a compound of the Formula $$[(R^1)Fe^{II}(R^2)]_a^+ \ [X]^{a-}$$

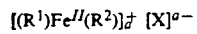

in which a is 1, 2, or 3, $R^1$ is an uncharged carbocyclic or heterocyclic aromatic ring, unsubstituted or substituted, $R^2$ is an unsubstituted or substituted cyclopentadienyl or indenyl anion, and $[X]^{a-}$ is an a-valent anion, to the coating as a latent curing catalyst before application, and heating the coating after application or irradiating it with actinic light and then heating it.

2. A process according to claim 1, wherein the coating is irradiated with actinic light and is heated to 50°–150° C. after being irradiated.

3. A process according to claim 2, wherein light of wavelength 200–600 nm is used for irradiation.

4. A process according to claim 1, wherein the catalyst used is a compound of the Formula 1 in which $R^1$ is benzene, toluene, xylene, cumene, methoxybenzene, chlorobenzene, 4-chlorotoluene, naphthalene, methylnaphthalene, chloronaphthalene, methoxynaphthalene, biphenyl, indene, pyrene, biphenylene sulfide, diphenyl ether, stilbene or 9(4-butylbenzyl)-anthracene.

5. A process according to claim 1, wherein the catalyst used is a compound of the Formula I in which $R^2$ is a cyclopentadienyl or ($C_1$–$C_4$-alkyl)-cyclopentadienyl anion.

6. A process according to claim 1, wherein the catalyst used is a compound of the Formula I in which $[X]^{a-}$ is the anion of a sulfonic acid.

7. A process according to claim 1, wherein the catalyst used is a compound of the Formula I in which $[X]^{a-}$ is one of the following anions: $F^-$, $Cl^-$, $Br^-$, $I^-$, $CN^-$, $NCO^-$, $NCS^-$, $CH_3-COO^-$, $CF_3COO^-$, $SO_4^{2-}$, $PO_4^{3}$, $NO_3^-$, $ClO_4^-$, $[(phenyl)_4B]^-$, $C_6H_5SO_3^-$, $CH_3C_6H_4SO_3^-$, $CF_3C_6H_4SO_3^-$, $CH_3SO_3^-$, $CF_3SO_3^-$, $C_4F_9SO_3^-$, $C_8F_{17}SO_3^-$, $C_6F_5SO_3^-$, $BF_4^-$, $AlF_4^-$, $AlCl_4^-$, $TiF_6^{2-}$, $PF_6^-$, $SbF_6^-$, $SbCl_6^-$, $GeF_6^-$, $ZrF_6^{2-}$, $AsF_6^-$, $FeCl_4^-$, $SnF_6^-$, $SnCl_6^-$ or $BiCl_6^-$.

8. A process according to claim 7, wherein the catalyst used is a compound of the Formula I in which a is 1 and $X^-$ is an anion belonging to the series comprising $BF_4^-$, $PF_6^-$, $SbF_6^-$, $AsF_6^-$, $CF_3COO^-$ or $C_8F_{17}SO_3^-$.

9. a process according to claim 1, wherein the catalyst used is the hexafluorophosphate, hexafluoroantimonate, trifluoromethanesulfonate, or heptadecafluorooctanesulfonate of ($\eta^6$-cumene)($\eta^5$-cyclopentadienyl)-iron (II) or of ($\eta^6$-2-methylnaphthalene)($\eta^5$-cyclopentadienyl)-iron(II).

10. A process according to claim 1, wherein a compound having a triplet energy of at least 30 kcal/mol is added to the latter, in addition, as a sensitizer.

11. A process according to claim 10, wherein a compound belonging to the class comprising the thioxanthones, phthalimides, coumarins or polycyclic aromatic compounds is added as the sensitizer.

12. A composition containing at least one polyhydroxy compound suitable for the preparation of polyurethane coatings, and an amount of a compound according to claim 1, which is effective as a latent curing catalyst for the polyurethane coating.

13. A composition according to claim 12, containing 0.01 to 10% by weight, relative to the polyhydroxy compound, of the latent curing catalyst.

14. A coating composed of a cured polyurethane obtained by the process of claim 1.

15. The process of polymerizing polyurethane precursor composition comprising at least one polyisocyanate and at least one polyol comprising the steps of:

a. admixing said polyurethane precursor composition and a catalytically effective amount of an ionic salt of an organometallic complex of the formula:

$$[(R^1)Fe^{II}(R^2)]_a^+ \ [X]^{a-}$$

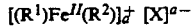

wherein a is 1 or 2;

$F^1$ benzene, toluene, xylene, cumene, methoxybenzene, chlorobenzene, 4-chlorotoluene, naphthalene, methylnaphthalene, chloronaphthalene, methoxynaphthalene, biphenyl, indene, pyrene, biphenylene sulfide, diphenyl ether, stilbene or 9-(4-butylbenzyl)anthracene;

$R^2$ is the cyclpentadienyl anion, a ($C_1$–$C_4$ alkyl)cyclopentadienyl anion, or the indenyl anion; and $[X]^{a-}$ is $F^-$, $Cl^-$, $Br^-$, $I^-$, $CN^-$, $NCO^-$, $NCS^-$, $CH_3COO^-$, $CF_3COO^-$, $SO_4^-$, $PO_4^-$, $NO_3^-$, $ClO_4^-$, $(phenyl)_4B^-$, $C_6H_5SO_3^-$, $CH_3C_6H_4SO_3^-$, $CF_3C_6H_4SO_3^-$, $CH_3SO_3^-$, $CF_3SO_3^-$, $C_4F_9SO_3^-$, $C_8F_{17}SO_3^-$, $C_6F_5SO_3^-$, $BF_4^-$, $AlF_4^-$, $AlCl_4^-$, TiF$_6$=, PF$_6^-$, SbF$_6^-$, SbCl$_6^-$, GeF$_6^-$, ZrF$_6$=, AsF$_6^-$, FeCl$_4^-$, SnF$_6^-$, SnCl$_6^-$, or BiCl$_6^-$; and b. curing the resulting admixture with at least an actinic radiation source.

16. An article comprising the cured product of the process according to claim 15.

17. The process of polymerizing polyurethane precursor composition comprising at least one polyisocyanate and at least one polyol comprising the steps of:
   a. admixing said polyurethane precursor composition and from 0.01 to 5%, by weight of solid content, of ($\eta^6$-cumene)($\eta^5$-cyclopentadienyl)iron (II) hexafluorophosphate; and
   b. curing the resulting admixture with an actinic radiation source.

18. A composition comprising (i) a polyhydroxy compound operable to form a polyurethane upon reaction with a polyisocyanate and (ii) a polymerization-initiating amount of a curing catalyst of the formula $$[(R^1)Fe^{II}(R^2)]_a^+ \ [X]^{a-}$$

in which a is 1, 2, or 3,
   R$^1$ is an uncharged carbocyclic or heterocyclic aromatic ring, which is unsubstituted or substituted;
   R$^2$ is cyclopentadienyl or indenyl anion which is unsubstituted or substituted; and
   [X]$^{a-}$ is an anion having a valence equal to a.

19. A composition according to claim 15 wherein R$^1$ is benzene, toluene, xylene, cumene, methoxyzene, chlorobenzene, 4-chlorotoluene, naphthalene, methynaphthalene, chloronaphthalene, methoxynaphthalene, biphenyl, indene, pyrene, biphenylene sulfide, diphenyl ether, stilbene or 9-(4-butylbenzyl)-anthracene;
   R$^2$ is cyclopentadienyl, unsubstituted or substituted with alkyl of 1 to 4 carbon atoms; and
   [X]$^{a-}$ is tetrafluoroborate, hexafluorophosphate, hexafluoroantimonate, hexafluoroarsenate, trifluoromethane sulfonate, or heptadecafluorooctanesulfonate.

20. A composition according to claim 19 further comprising a polyisocyanate in an amount sufficient to react with said polyhydroxy compound.

21. a composition according to claim 20 wherein the curing catalyst is the hexafluorophosphate, hexafluoroarsenate, or hexafluoroantimonate salt of ($\eta^6$-cumene) ($\eta^5$-cyclopentadienyl)-iron(II).

22. An energy polymerizable composition comprising at least one polyisocyanate polyurethane precursor and at least one polyol polyurethane precursor and a catalytically effective amount of an ionic salt of an organometallic complex of the formula:

$$[(R^1)Fe^{II}(R^2)]_a^+ \ [X]^{a-}$$

wherein a is 1 or 2;
   R$^1$ is benzene, toluene, xylene, cumene, methoxybenzene, chlorobenzene, 4-chlorotoluene, naphthalene, methylnaphthalene, chloronaphthalene, methoxynaphthalene, biphenyl, indene, pyrene, biphenylene sulfide, diphenyl ether, stilbene or 9-(4-butylbenzyl)anthracene;
   R$^2$ is the cyclopentadienyl anion, a (C$_1$-C$_4$ alkyl)cyclopentadienyl anion, or the idenyl anion; and
   [X]$^{a-}$ is F$^-$, Cl$^-$, Br$^-$, I$^-$, CN$^-$, NCO$^-$, NCS$^-$, CH$_3$COO$^-$, CF$_3$COO$^-$, SO$_4^-$, PO$_4^-$, NO$_3^-$, ClO$_4^-$, (phenyl)$_4$B$^-$, C$_6$H$_5$SO$_3^-$, CH$_3$C$_6$H$_4$SO$_3^-$, CF$_3$C$_6$H$_4$SO$_3^-$, CH$_3$SO$_3^-$, CF$_3$SO$_3^-$, C$_4$F$_9$SO$_3^-$, C$_8$F$_{17}$SO$_3^-$, C$_6$F$_5$SO$_3^-$, BF$_4^-$, AlF$_4^-$, AlCl$_4^-$, TiF$_6$=, PF$_6^-$, SbF$_6^-$, SbCl$_6^-$, GeF$_6^-$, ZrF$_6$=, AsF$_6^-$, FeCl$_4^-$, SnF$_6^-$, SnCl$_6^-$, or BiCl$_6^-$.

23. An article comprising the cured composition according to claim 22.

24. A light polymerizable composition comprising at least one polyisocyanate polyurethane precursor and at least one polyol polyurethane precursor and from 0.01 to 5%, by weight of solid content, of ($\eta^6$-cumene)($\eta^5$-cyclopentadienyl)iron (II) hexafluorophosphate.

* * * * *